United States Patent [19]

Anderson

[11] Patent Number: 4,758,055
[45] Date of Patent: Jul. 19, 1988

[54] SNOWMOBILE STUD

[76] Inventor: Lynn J. Anderson, 13365 Newlander Ave., Lindstrom, Minn. 55045

[21] Appl. No.: 939,094

[22] Filed: Dec. 8, 1986

[51] Int. Cl.[4] .............................................. B62D 55/26
[52] U.S. Cl. .................................. 305/35 EB; 305/54
[58] Field of Search ................ 305/35 EB, 39, 54, 55, 305/60, 35 R; 29/526; 471/531, 533, 10, 11

[56] References Cited

U.S. PATENT DOCUMENTS

| | | | |
|---|---|---|---|
| 2,426,974 | 9/1947 | Ragon | 152/210 |
| 3,572,851 | 3/1971 | Schuler | 305/35 |
| 3,767,275 | 10/1973 | Russ, Sr. | 305/38 |
| 3,782,787 | 1/1974 | Rubel et al. | 305/35 EB |
| 3,838,894 | 10/1974 | Reedy | 305/35 EB |
| 3,865,441 | 2/1975 | Jolliffe | 305/54 |
| 3,930,689 | 1/1976 | Maki | 305/35 EB |
| 3,973,808 | 8/1976 | Janssen et al. | 305/35 |
| 4,059,315 | 11/1977 | Jolliffe et al. | 305/35 EB |
| 4,095,849 | 6/1978 | Husted | 305/35 R |
| 4,218,101 | 8/1980 | Thompson | 305/54 X |

FOREIGN PATENT DOCUMENTS 155085  6/1956  Sweden .

OTHER PUBLICATIONS

"Grabbers" brochure/catalog.

*Primary Examiner*—Johnny D. Cherry
*Assistant Examiner*—Russell D. Stormer
*Attorney, Agent, or Firm*—Jacobson and Johnson

[57] ABSTRACT

A snowmobile stud for attachment to a flexible resilient snowmobile track with the stud having a cylindrical member having a flat stud head of predetermined area on one end with edges to hold the stud head from rotating during assembly, an intermediate threaded section, a conical-like point extending from the cylinder member and a lock nut for holding the stud on a snowmobile track. Located between the lock nut and the resilient flexible track is a cleat which has sufficiently large surface area to prevent it from becoming embedded in the track, the material of the stud is of predetermined hardness so as to sustain the high speed abuse that occurs when racing snowmobiles on ice.

11 Claims, 2 Drawing Sheets

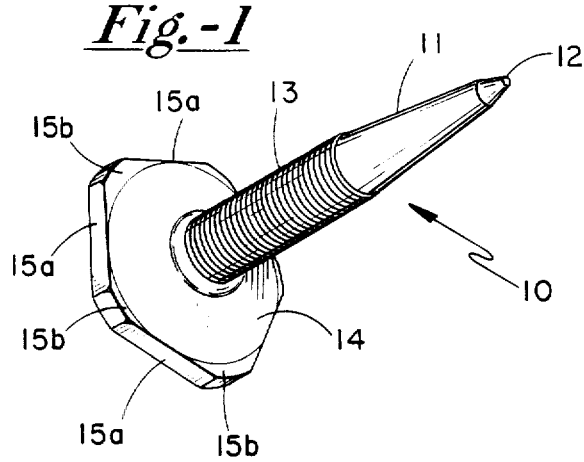
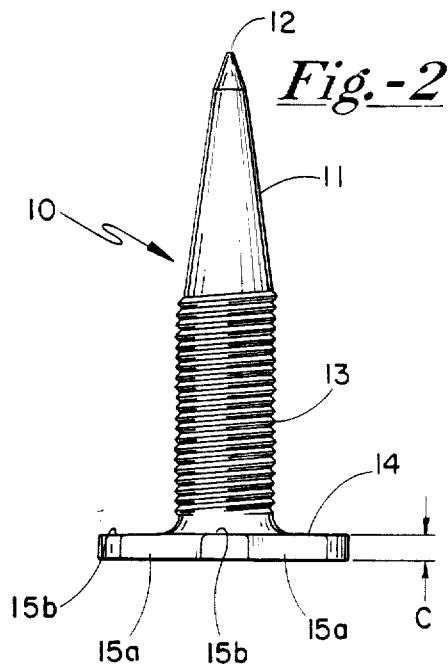
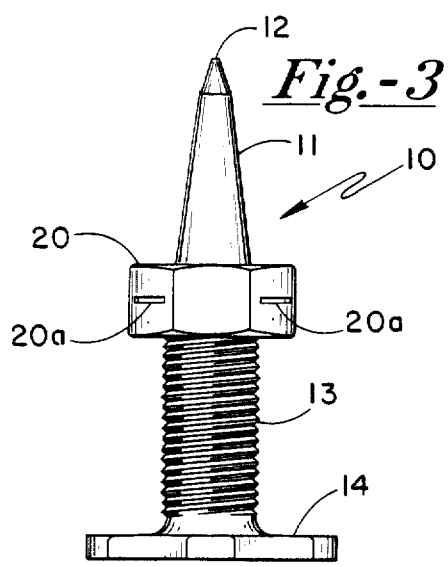
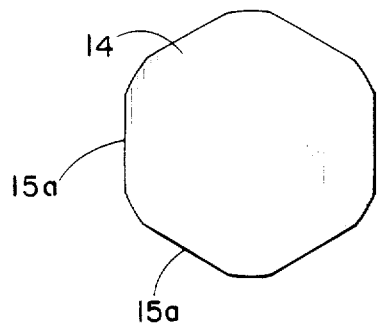
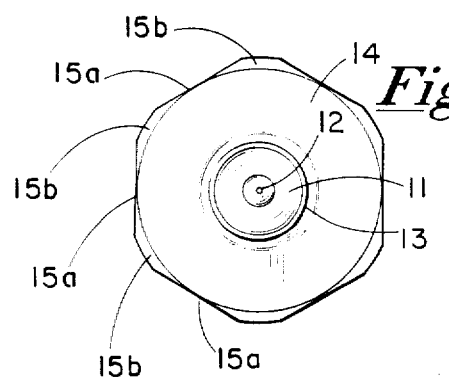
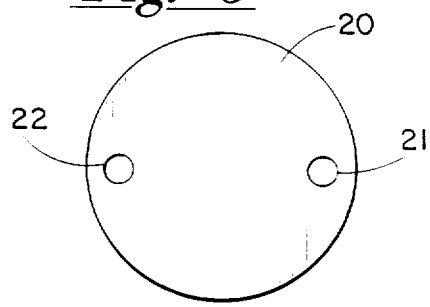

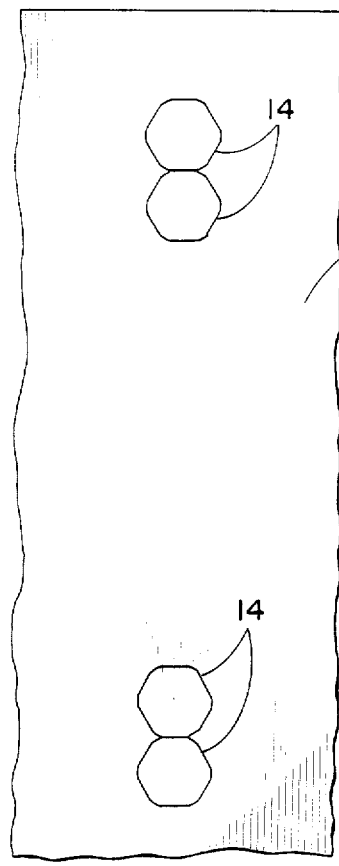
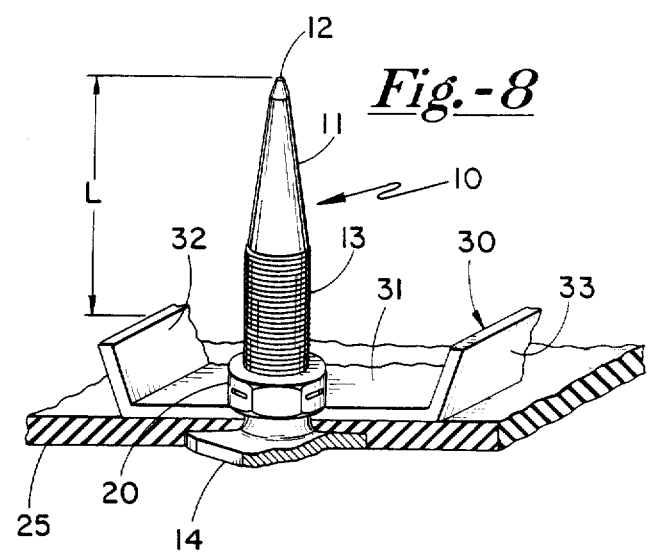
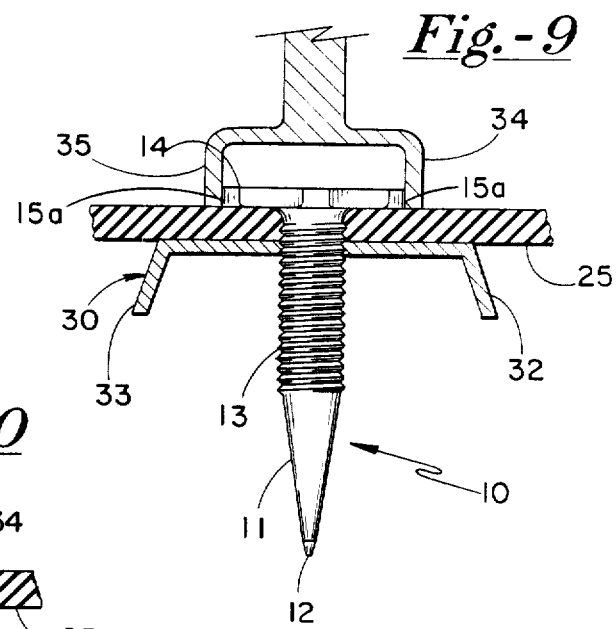
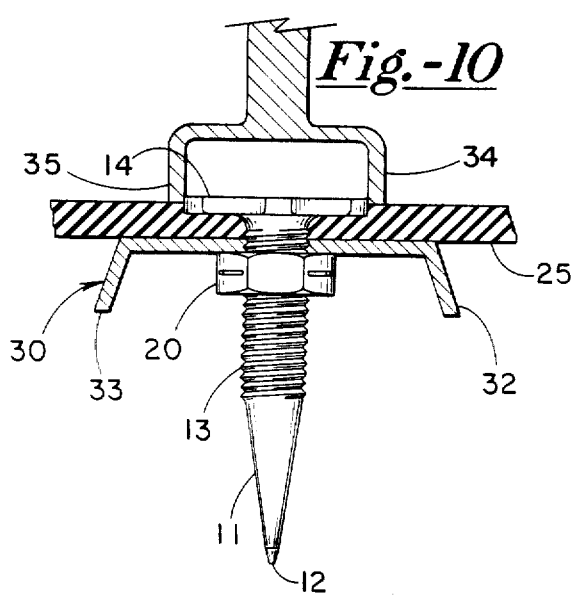

SNOWMOBILE STUD

FIELD OF THE INVENTION

This invention relates generally to studs and more specifically, to studs for attaching to snowmobile tracks.

BACKGROUND OF THE INVENTION

The concept of studs for vehicle wheels that travel over mud and snow is old in the art. Typically, some type of spike or stud is located on the exterior of the wheel to grab or bite the ice or mud. With the innovation of snowmobiles and the advent of snowmobile racing on ice, there has been a need for a lightweight snowmobile stud for use on the elongated flexible snowmobile tracks. Since snowmobiles may travel in excess of 100 miles per hour, it creates a high centrifugal force on both the studs and the snowmobile track. Also, since the tracks are flexible and oftentimes only one-eighth of an inch thick, the studs must be lightweight, easy to apply and yet have sufficient tensile strength to bite the ice. One of the prior art snowmobile studs comprises a three-part stud having a back member which is threaded onto the rear end of the stud and a front member having a sharpened point which is threaded onto the opposite end of the stud to provide an ice stud. Other studs use specially designed bolts which have a large head for putting on the opposite side of the belt and a claw-like member which is attached to the opposite side of the track with a nut holding the claw onto the outside surface of the track.

Prior to the advent of studs for snowmobiles there existed studs in other arts, for example, the Ragon U.S. Pat. No. 2,426,974 shows a stud which fastens to an outer casing that attaches to an automobile tire.

The Russ U.S. Pat. No. 3,767,275 shows a traction element for a snowmobile racing track. The Russ device comprises a metal stiffener which extends across the track. Extending outward from the metal stiffener are a set of traction elements that bite into the ice.

The Husted U.S. Pat. No. 4,095,849 shows a protruding blade which engages the ice and snow. The blade is attached to the link chain of a power driven ski-type device.

The Swedish Patent No. 155,085 shows a bolt-like stud having two washer-like members that sandwich a tire casing from both sides.

Other embodiments of snowmobile studs are shown in the catalog sheet GRABBERS included herewith as part of the prior art.

BRIEF SUMMARY OF THE INVENTION

Briefly, the invention comprises a stud for attachment to a flexible resilient snowmobile track with the stud comprising a cylindrical member having a flat stud head of predetermined area on one end with means to hold the stud head from rotating during assembly, an intermediate threaded section, a conical-like point extending from the cylinder member and a lock nut for holding the stud in position. Located between the lock nut and the resilient flexible track is a cleat which has sufficiently large surface area to prevent it from becoming embedded in the track, the material of the stud is of predetermined hardness so as to sustain the high speed abuse that occurs when racing snowmobiles on ice.

BRIEF DESCRIPTION OF THE DRAWINGS

FIG. 1 is a pictorial view of the snowmobile stud of the present invention;

FIG. 2 is a front elevation view of the snowmobile stud of the present invention;

FIG. 3 is a front elevation view with a fastener shown located on the snowmobile stud;

FIG. 4 is a back rear view of the snowmobile stud;

FIG. 5 is a top view of a snowmobile stud;

FIG. 6 is a back view of an alternate embodiment of the snowmobile stud;

FIG. 7 is a rear view of a snowmobile track showing a pair of studs located side-by-side thereon;

FIG. 8 is an enlarged sectional view of the snowmobile stud attached to a snowmobile track;

FIG. 9 shows a snowmobile stud to be attached to a flexible snowmobile track; and FIG. 10 shows a snowmobile stud as it is brought into position on the snowmobile track.

DESCRIPTION OF THE PREFERRED EMBODIMENT

Referring to FIG. 1 and FIG. 2, reference numeral 10 identifies the snowmobile stud of the present invention. Stud 10 has a flat head 14 with a hexagonal outer peripheral surface 15a to form gripping engagement with an assembly tool. Stud 10 has a head thickness C of 1/16 inches and has a cylindrical section with a threaded section 13 that extends upward from the cylindrical section 14a extending from head 14. The cylindrical radiused section 14a extends upward to connect head 14 to threaded section 13. Located on the opposite end of stud 10 is a conical section 11 which terminates in a sharp point 12. Cylindrical threaded section 13 is approximately ¼" in diameter with ¼-20 threads or the like thereon.

FIG. 3 illustrates stud 10 with a self-locking nut 20 attached to stud 10. Self-locking nut 20 is of the type having indents 20a in the nut which produce a frictional resistance which prevents nut 20 from vibrating loose.

FIG. 4 shows a rear view of the flat head 14 of stud 10 as well as the surfaces 15a which permit engagement of head 14 with a tool.

FIG. 5 shows lands 15b which are the areas located outside a circle scribed within head 14. Lands 15b comprise a beveled surface which slopes outward from the circle scribed within head 14. The purpose of lands 15b is to remove the normally sharp corners produced by the junction of surfaces since rotation of the stud with a sharp member during racing may cut and wear through the thin snowmobile track.

FIG. 6 shows an alternate embodiment of a stud head in which the hex head has been replaced by a round head 20 having a first opening 21 and a second opening 22 to engage a holding tool. The purpose of having a tool to grip head 20 is for assembly purposes since it permits the operator to hold the stud to prevent rotation of the stud as the lock nut 20 is threaded onto the thread section. Since lock nuts offer frictional resistance to turning, it is necessary to somehow hold the stud to prevent its rotation.

FIG. 7 shows how the hex head shapes can be utilized in a side-by-side location to prevent rotation of the stud. That is, the studs with the heads 14 abutted against one another on track 25 prevent rotation of either stud. However, in other applications the studs may be located in a spaced pattern and not adjacent to one another.

Referring to FIG. 8, there is shown a portion of a flexible resilient snowmobile track 25 which has a thickness of approximately ⅛ of an inch. A snowmobile cleat 30 having a substantially larger surface area than head 14 extends from the top surface of track 25. Snowmobile cleat 30 has a flat surface 31 that extends along the top side of track 25 and two upward projecting edges 32 and 33 which add rigidity to the cleat and also provide an additional gripping surface. Located in the center of cleat 30 is stud 10 which holds cleat 30 in pressure contact with track 25. FIG. 8 illustrates that there is very little if any embedding of cleat 30 in track 25, however the snowmobile stud 10 of my invention has head 14 which is fully embedded into the flexible resilient snowmobile track. It should be understood that a typical racing snowmobile track has a thickness of approximately ⅛ of an inch and that the head of my stud is approximately 1/16 of an inch. In my preferred embodiment I limit the embedding of the stud to approximately half the thickness of the head. The purpose of embedding the head in only one side of the track is to provide a smooth inner surface. Since the tracks are generally very thin it is necessary that the studs not be embedded or squeezed too far into the track since it may weaken the track. Holding cleat 20 against the top portion of the track 25 is a self-clinching nut 20 which is threaded downward sufficiently far so as to be located below the top edge of cleat 30. The top portion of the stud extends about ⅜ of an inch above the top of the cleat.

FIGS. 9 and 10 illustrate the process in how stud 10 is properly applied to a resilient flexible snowmobile track. The process of applying a stud to a snowmobile track comprises the steps of forming an opening in a flexible resilient snowmobile track, placing a snowmobile stud having a flat head with a track-engaging area through the opening in the flexible resilient snowmobile track, placing a member having a track-engaging area larger than the track-engaging area of the head around the snowmobile stud to thereby sandwich the snowmobile track between the flat head and the member, placing a tool on the head of the stud to prevent rotation of the stud, turning a nut on the stud to draw the head of the stud into the resilient track, and continuing to turn the nut until the resiliency of the track causes the tool to disengage the head of the snowmobile stud. FIG. 9 shows a stud with the flats 15a on head 14 being held by wrench jaw ends 34 and 35. Note that in this step the head 14 of stud 10 sits on the top surface of track 25.

FIG. 10 shows a partially assembled view with lock nut 20 partially tightened to draw head 14 into flexible snowmobile track 25. Since the area of head 14 is smaller than the area of cleat 30, the head begins to embed itself in the track as the lock nut 20 is tightened. A feature of the present invention is that use of a holding tool on the surface of the head that is embedded in the track is that the stud automatically reaches a predetermined position, i.e., as the head 14 of stud 10 is drawn inward the wrench jaws 34 and 35 lose contact with the surface 15a. When this occurs, one cannot further tighten lock nut 20 since the frictional pressure of the lock nut rotates the stud and the embedded head. When this condition occurs, the user knows the stud is located at the proper depth.

Stud 10 which must survive a wide range of temperatures and physical abuse is typically made from a 11L44 leaded Free machine steel having a composition of 0.40% carbon, 1.42% manganese, 0.014% phosphorus, 0.30% sulpher, 0.14% silicon, 0.32% lead with the balance iron. In order to insure proper hardness, the stud was hardened to a Rockwell C of approximately 50.

The combination of my stud with a lightweight snowmobile cleat provides an excellent support to prevent undue bending of stud head 14 in track 25, since the stud head 14 and cleat 24 firmly sandwich the track 25 therebetween. The combination of a lock nut 20 and the resiliency provided by compressing track 25 has been found to provide a lightweight stud which can be quickly replaced if one should break as well as a stud that will not work loose during extensive use. While a cleat is shown as the larger member, other washer-like members could be used alone as they have sufficient area to prevent the stud from being drawn into the track from both sides.

While FIG. 5 shows a hex head and FIG. 6 shows a round head with openings to hold the stud to prevent rotation, other nonprotruding means to hold the stud from turning could be used such as a female socket head having a hex shape to engage a male hex socket tool. In addition, other shapes such as slots or torx style recess could be used in the head of my stud.

I claim:

1. A single snowmobile stud for attachment to a flexible resilient snowmobile track of predetermined thickness comprising:

a cylindrical member;

a head, said head connected to one end of said cylindrical member, said head comprising a first section of predetermined size for engaging a first surface of a snowmobile track of predetermined thickness and a second section for extending substantially coplanar to the outer surface of a snowmobile track, said head free of surfaces that may cut and wear the snowmobile track if said stud rotates in use, said head including surfaces for engagement with a tool to prevent rotation of the stud as the stud is applied to a snowmobile track, said cylindrical member extending substantially perpendicular from said head, said cylindrical member having an intermediate threaded section for engaging a threaded fastening member, said cylindrical section having a pointed end for engaging ice or the like;

a threaded fastener for holding said stud to said track; and a member for placing against a second surface of a snowmobile track to thereby sandwich a snowmobile track between said head and said member, said member having a larger surface area than said head to thereby cause said head to be drawn into a snowmobile track away from the tool as said threaded fastener is rotated to compressedly sandwich a snowmobile track between said member and said head.

2. The invention of claim 1 wherein the head of said stud is embedded in a snowmobile track so that the head is flush with the surface of the snowmobile track.

3. The invention of claim 1 wherein said threaded fastener comprises a lock nut.

4. The invention of claim 3 wherein said stud has a conical point.

5. The invention of claim 3 wherein the head of the stud is embedded a minimum of half its thickness into the snowmobile track.

6. The invention of claim 4 wherein the head of said snowmobile stud has beveled lands to prevent damaging the snowmobile track.

7. The invention of claim 5 wherein said head has a hexagon shape.

8. The invention of claim 4 wherein said stud has a round head with openings therein for engaging a tool.

9. The invention of claim 1 wherein said member is a cleat.

10. The invention of claim 7 wherein two studs are located adjacent to each other to prevent rotation of the studs.

11. The process of applying a stud to a snowmobile track comprising the steps of:

forming an opening in a flexible resilient snowmobile track;

placing a snowmobile stud having a flat head with a track-engaging area through the opening in the flexible resilient snowmobile track;

placing a member having a track-engaging area larger than the track-engaging area of the head around the snowmobile stud to thereby sandwich the snowmobile track between the flat head and the member;

placing a tool on the head of the stud to prevent rotation of the stud;

turning a nut on the stud to draw the head of the stud into the resilient track; and continuing to turn the nut until the head of the nut is drawn into and embedded into the track causing the tool to disengage the head of the snowmobile stud.

* * * * *

REEXAMINATION CERTIFICATE (2510th)
United States Patent [19]
Anderson

[11] B1 4,758,055
[45] Certificate Issued Mar. 28, 1995

[54] SNOWMOBILE STUD

[76] Inventor: Lynn J. Anderson, 13365 Newlander Ave., Lindstrom, Minn. 55045

Reexamination Request:
No. 90/003,358, Mar. 14, 1994

Reexamination Certificate for:
| | |
|---|---|
| Patent No.: | 4,758,055 |
| Issued: | Jul. 19, 1988 |
| Appl. No.: | 939,094 |
| Filed: | Dec. 8, 1986 |

[51] Int. Cl.$^6$ ............................................. B62D 55/26
[52] U.S. Cl. ................................ 305/35 EB; 305/54
[58] Field of Search ................. 305/35 EB, 35 R, 38, 305/39, 54, 55, 60; 411/531, 542, 402, 403, 404, 10–12

[56] References Cited

U.S. PATENT DOCUMENTS

| | | | |
|---|---|---|---|
| 1,774,695 | 9/1930 | Baynes | 411/11 |
| 2,426,974 | 9/1947 | Ragon | 152/210 |
| 3,572,851 | 3/1971 | Schuler | 305/352 |
| 3,767,275 | 10/1973 | Russ, Sr. | 305/38 |
| 3,782,787 | 1/1974 | Rubel et al. | 305/35 EB |
| 3,785,420 | 1/1974 | Bradley et al. | 151/37 |
| 3,785,670 | 1/1974 | Smith | 411/403 X |
| 3,838,894 | 10/1974 | Reedy | 305/35 EB |
| 3,865,441 | 2/1975 | Joliffe | 305/54 |
| 3,930,689 | 1/1976 | Maki | 305/35 EB |
| 3,973,808 | 8/1976 | Janssen et al. | 305/54 |
| 4,006,661 | 2/1977 | Sims, Jr. | 411/11 |
| 4,059,315 | 11/1977 | Joliffe et al. | 305/35 EB |
| 4,095,849 | 6/1978 | Husted | 35/35 R |
| 4,218,101 | 8/1980 | Thompson | 305/54 X |
| 4,310,273 | 1/1982 | Kirrish | 411/542 X |
| 4,749,298 | 6/1988 | Bundt et al. | 411/403 X |

FOREIGN PATENT DOCUMENTS

| | | | |
|---|---|---|---|
| 103274 | 12/1925 | Austria | 411/531 |
| 155085 | 6/1956 | Sweden | |

OTHER PUBLICATIONS

P. 50 and cover of Nov./Dec. 1975 issue of *Snowmobiler's Race and Rally* Magazine.
P. 13 of the Nov. 1975 issue of *Snotrack* Magazine.

*Primary Examiner*—Russell D. Stormer

[57] ABSTRACT

A snowmobile stud for attachment to a flexible resilient snowmobile track with the stud having a cylindrical member having a flat stud head of predetermined area on one end with edges to hold the stud head from rotating during assembly, an intermediate threaded section, a conical-like point extending from the cylinder member and a lock nut for holding the stud on a snowmobile track. Located between the lock nut and the resilient flexible track is a cleat which has sufficiently large surface area to prevent it from becoming embedded in the track, the material of the stud is of predetermined hardness so as to sustain the high speed abuse that occurs when racing snowmobiles on ice.

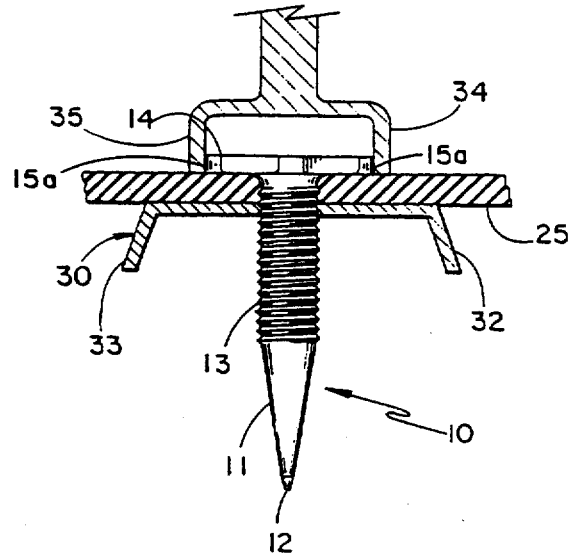
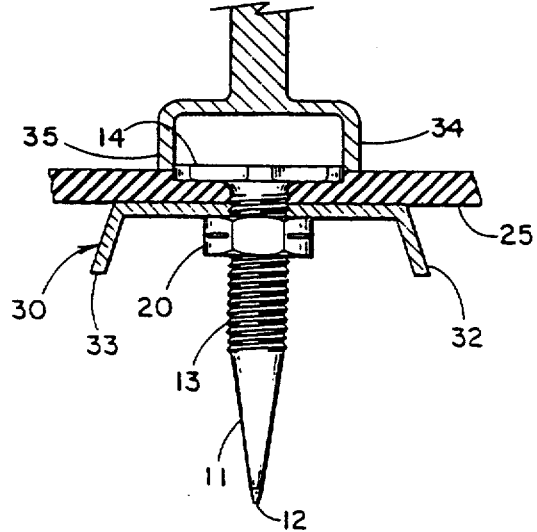

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-10 and 11 are determined to be patentable as amended.

New claim 12 is added and determined to be patentable.

1. A single snowmobile stud *assembly for* attachment to a flexible resilient snowmobile track of predetermined thickness *for engaging ice, by using a tool, said resilient snowmobile track having an inner surface and an outer surface, said stud assembly* comprising:
   a threaded fastener for holding the single snowmobile stud to the resilient snowmobile track;
   a single snowmobile stud *made from hardened, machine steel and* comprising:
   a cylindrical member, said cylindrical member having a first end and an opposite, pointed end for engaging ice;
   a head, *said head having a surface area, and* said head connected to [one] *said first* end of said cylindrical member, said head comprising a first section of predetermined size for engaging [a first] *the inner* surface of a snowmobile track of predetermined thickness and a second section for extending substantially [coplanar] *parallel* to the [outer] *inner* surface of [a] *the* snowmobile track, said head free of surfaces that may cut and wear the snowmobile track if said stud rotates in use, said head including surfaces for engagement with [a] *the* tool to prevent rotation of the stud as the stud is applied to [a] *the resilient* snowmobile track, said cylindrical member *having a length* extending substantially perpendicular [from] *to* said head, said cylindrical member having an intermediate threaded section for engaging [a] *said* threaded [fastening member] *fastener*, said cylindrical section [having a] *terminating in a single, sharp point at said* pointed end for engaging ice [or the like]; *and*
   [a threaded fastener for holding said stud to said track; and]
   a member for placing against [a second] *the outer* surface of [a] *the resilient* snowmobile track to thereby sandwich [a] *the resilient* snowmobile track between said head and said member, said member having a larger surface area than *said surface area of* said head, to thereby cause said head to be drawn into [a] *the resilient* snowmobile track *in a direction* away from the tool *with the tool engaging said head surfaces* as said threaded fastener is rotated to compressedly sandwich [a] *the resilient* snowmobile track between said member and said head[.], *said length of said cylindrical member being long enough that said pointed end thereof projects beyond all surfaces of said member for plac-* ing against the outer surface of the snowmobile track for contact with the ground, when the stud assembly is in place on a snowmobile track.

2. The [invention] *single snowmobile stud assembly* of claim 1 wherein the head of [said] *the single snowmobile* stud is embedded in [a] *the resilient* snowmobile track so that the head is flush with the *inner* surface of the *resilient* snowmobile track.

3. The [invention] *single snowmobile stud assembly* of claim 1 wherein [said] *the* threaded fastener comprises a lock nut.

4. The [invention] *single snowmobile stud assembly* of claim 3 wherein [said] *the pointed end of the cylindrical member of the single snowmobile stud* [has a] *is* conical [point].

5. The [invention] *single snowmobile stud assembly* of claim 3 wherein the head of the *single snowmobile* stud *has a thickness and* is embedded a minimum of half [its] *said* thickness into the *resilient* snowmobile track.

6. The [invention] *single snowmobile stud assembly* of claim [4] *1* wherein the head of [said] *the single* snowmobile stud has beveled lands to prevent damaging the *resilient* snowmobile track.

7. The [invention] *single snowmobile stud assembly* of claim 5 wherein said head has a [hexagon] *hexagonal* shape.

8. The [invention] *single snowmobile stud assembly* of claim 4 wherein [said] *the head of the single snowmobile* stud [has a] *is* round [head with] *and further has* openings therein [for engaging a] *defining the surfaces for engagement with the* tool.

9. The [invention] *single snowmobile stud assembly* of claim 1 wherein [said] *the* member is a cleat.

10. The [invention] *single snowmobile stud assembly* of claim 7 wherein two *like single snowmobile* studs are located adjacent to each other to prevent rotation of the *two like snowmobile* studs.

11. The [process of applying] *method for mounting* a stud [to] *on a flexible resilient* snowmobile track *using a tool, said stud having a flat head with a first track-engaging area, a nut, and a member with a second track-engaging area larger than the first track engaging area of said flat head, said method* comprising the steps of:
   forming an opening in [a] *the* flexible resilient snowmobile track;
   placing [a snowmobile] *the* stud [having a flat head with a track engaging area] through [the] *said* opening in the flexible resilient snowmobile track[;] *with the first track-engaging area of the head against the track;*
   placing [a] *the* member [having a track-engaging area larger than the track-engaging area of the head] around the [snowmobile] stud to thereby sandwich the *flexible resilient* snowmobile track between the flat head and the member;
   placing [a] *the* tool on the head of the stud to prevent rotation of the stud;
   turning [a] *the* nut on the stud to draw the head of the stud into the *flexible* resilient track; and
   continuing to turn the nut until the head of the [nut] *stud* is drawn into and embedded into the *flexible resilient* track causing the tool to disengage *from* the head of the [snowmobile] stud.

12. *The single snowmobile stud assembly of claim 1 wherein the head of the single snowmobile stud has beveled peripheral edge surfaces to prevent damaging the resilient snowmobile track.*

* * * * *